US009979891B2

(12) United States Patent
Huang

(10) Patent No.: US 9,979,891 B2
(45) Date of Patent: May 22, 2018

(54) ELECTRONIC DEVICE AND METHOD FOR CAPTURING PHOTO BASED ON A PREVIEW RATIO BETWEEN AN AREA OF A CAPTURING TARGET AND AND AREA OF A PREVIEW IMAGE

(71) Applicant: Chiun Mai Communication Systems, Inc., New Taipei (TW)

(72) Inventor: Kai-Lin Huang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days. days.

(21) Appl. No.: 15/160,627

(22) Filed: May 20, 2016

(65) Prior Publication Data

US 2016/0353031 A1 Dec. 1, 2016

(30) Foreign Application Priority Data

May 30, 2015 (CN) .......................... 2015 1 0290640

(51) Int. Cl.
*H04N 5/232* (2006.01)
*G06K 9/00* (2006.01)

(52) U.S. Cl.
CPC ..... *H04N 5/23293* (2013.01); *G06K 9/00684* (2013.01); *H04N 5/23219* (2013.01); *H04N 5/23222* (2013.01)

(58) Field of Classification Search
CPC .......... H04N 5/23293; H04N 5/23222; H04N 5/23219; G06T 7/60; G06K 9/6267
See application file for complete search history.

(56) References Cited

U.S. PATENT DOCUMENTS

| | | | | |
|---|---|---|---|---|
| 8,687,104 B2* | 4/2014 | Penov | ................ | H04N 5/23293 348/222.1 |
| 2002/0044691 A1* | 4/2002 | Matsugu | .................. | G06K 9/20 382/218 |
| 2003/0071908 A1* | 4/2003 | Sannoh | .............. | H04N 5/23212 348/345 |
| 2014/0198980 A1* | 7/2014 | Fukui | ................. | G06K 9/00677 382/159 |

FOREIGN PATENT DOCUMENTS

CN 101729976 B 5/2014

* cited by examiner

*Primary Examiner* — Gevell Selby
(74) *Attorney, Agent, or Firm* — ScienBiziP, P.C.

(57) ABSTRACT

A photo capturing method includes recognizing a capturing target of a preview image of a camera device. A preview ratio of the preview image is obtained by calculating a ratio between an area of a smallest rectangle enclosing the capturing target in the preview image and an area of the preview image is calculated. A category that the preview image belongs to is determined according to the capturing target. An average ratio of the determined category is obtained. Once the preview ratio is not equal to the average ratio of the determined category, a capturing range of the camera device is adjusted.

24 Claims, 6 Drawing Sheets

| Photo categories | A number of photos included in the category | Average ratio | ... |
|---|---|---|---|
| Personal photo | 6 | 60% | ... |
| Group photos | 10 | 80% | ... |
| Human face photos | 7 | 70% | ... |
| ... | ... | ... | ... |

FIG. 4

ELECTRONIC DEVICE AND METHOD FOR CAPTURING PHOTO BASED ON A PREVIEW RATIO BETWEEN AN AREA OF A CAPTURING TARGET AND AND AREA OF A PREVIEW IMAGE

CROSS-REFERENCE TO RELATED APPLICATIONS

This application claims priority to Chinese Patent Application No. 201510290640.5 filed on May 30, 2015, the contents of which are incorporated by reference herein.

FIELD

The subject matter herein generally relates to photo capturing technology, and particularly to an electronic device and a method for capturing a photo using the electronic device.

BACKGROUND

An electronic device such as a mobile phone configured with a camera device, can be used to capture photos. However, when a user uses the electronic device to capture a photo, the user needs to manually adjust a capturing range of the camera device. It is not convenient.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

FIG. 4 illustrates an example of a data table that records data of photos.

DETAILED DESCRIPTION

Figure 1:
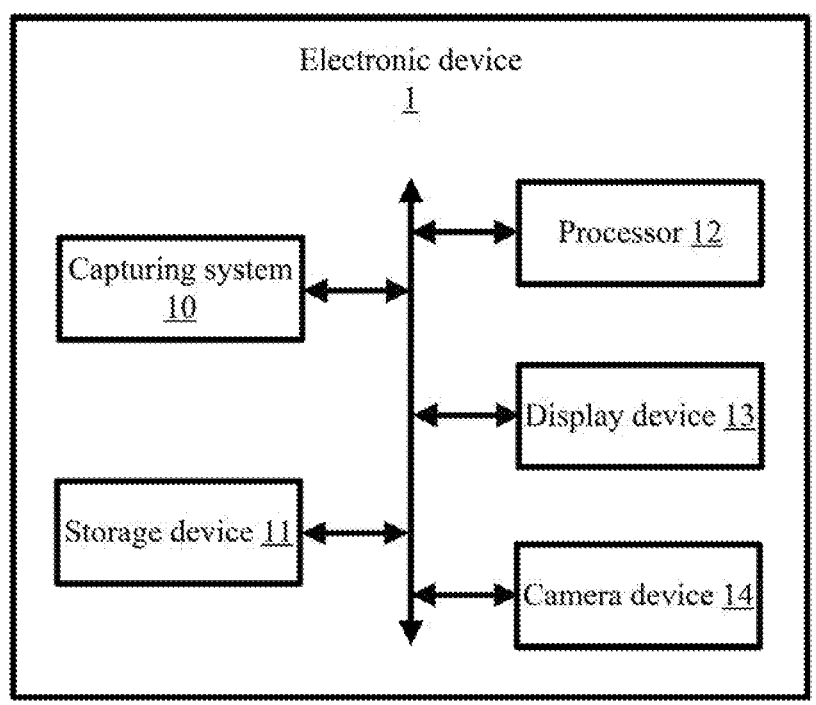
FIG. 1 is a block diagram of one embodiment of an electronic device including a capturing system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 is a block diagram of one embodiment of an electronic device. Depending on the embodiment, an electronic device 1 can include, but is not limited to, a capturing system 10, a storage device 11, at least one processor 12, a display device 13, and a camera device 14. The above components communicate with each other through a system bus. In at least one embodiment, the electronic device 1 can be a capture device, or a mobile phone, a tablet computer, a personal digital assistant, or any other suitable device configured with a function of capturing photos. FIG. 1 illustrates only one example of the electronic device 1 that can include more or fewer components than illustrated, or have a different configuration of the various components in other embodiments. For example, the electronic device 1 may further include a lighting device.

In at least one embodiment, the storage device 11 can be a memory of the electronic device 1. In other embodiments, the storage device 11 can be a secure digital card, or other external storage device such as a smart media card.

The at least one processor 12 can be a central processing unit (CPU), a microprocessor, or other data processor chip that performs functions of the electronic device 1.

In at least one embodiment, the storage device 11 can be used to store program codes of the capturing system 10, an image processing software, and a database of the electronic device 1. The storage device 11 can further store photos captured by the capturing system 10.

In at least one embodiment, the image processing software can be a conventional face recognition software. The image processing software can recognize the photos stored in the electronic device 1 and determine a capturing target of each of the photos. In at least one embodiment, a capturing target of a photo can be defined to be a subject such as a human face in the photo, a group of people in the photo. The image processing software can further determine a ratio of each of the photos. In at least one embodiment, a ratio of one of the photos can be defined to be a ratio between an area of a smallest rectangle enclosing the capturing target in the one photo and an area of the one photo. In at least one embodiment, the area of the smallest rectangle enclosing the capturing target in the one photo can be obtained by multiplying pixels of a length of the smallest rectangle by pixels of a width of the smallest rectangle. The area of the one photo can be obtained by multiplying pixels of a length of the one photo by pixels of a width of the one photo.

In at least one embodiment, the database can include a data table that records data of all the photos that are recognized by the image processing software. In at least one embodiment, the data table can include a number of columns. As shown in FIG. 4, the number of columns can include, but are not limited to, a first column that is used to record photo categories, a second column that is used to record a number of photos included in each category, and a third column that is used to record an average ratio of each category, wherein an average ratio of one of the categories is an average of all the ratios of the photos included in the one category.

In at least one embodiment, the image processing software can classify the photos into different categories according to the capturing targets of the photos. For example, the photos can be classified into a first category in which the capturing target of the photos is a person, a second category in which the capturing target of the photos is a group of people, a third category in which the capturing target of the photos is a human face, and a fourth category in which the capturing target of the photos is goods. In other words, the first category may include personal photos, the second category may include photos which include a group of people, the third category may include human face photos, and the fourth category may include photos of goods.

In at least one embodiment, when the number of photos included in one of the categories is greater than a preset value (e.g., 1), the image processing software can calculate an average ratio of the one category. For example, as shown in FIG. 4, the first category includes six personal photos, and an average on all the ratios of the six personal photos is 60%.

In at least one embodiment, the capturing system 10 can set the average ratio of one of the categories to be a reference ratio of the one category. In other words, the average ratio can be referred by a photo belonging to the one category that is ready to be captured. In other embodiments, when one of the categories includes only one photo, an average ratio of the one category is a ratio of the one photo.

In at least one embodiment, the display device 13 can be used to display a preview image of the camera device 14 and/or photos captured by the camera device 14. The display device 13 can be a liquid crystal display, or an organic light-emitting diode display. The camera device 14 can capture photos of a scene in front of the camera device 14. The camera device 14 can be a front camera device, or a rear camera device.

In at least one embodiment, when the electronic device 1 runs the capturing system 10, and the camera device 14 is activated, the capturing system 10 can determine a capturing target of a preview image of the camera device 14, by invoking the image processing software to recognize the preview image. That is, the capturing system 10 can determine which category the preview image belongs to, according to the capturing target of the preview image. The capturing system 10 can further calculate a preview ratio of the preview image. When the preview ratio is not equal to the average ratio of the determined category, the capturing system 10 can automatically adjust a capturing range of the camera device 14, to ensure the preview ratio equals to the average ratio of the determined category. Details will be provided in the following paragraphs.

Figure 2:
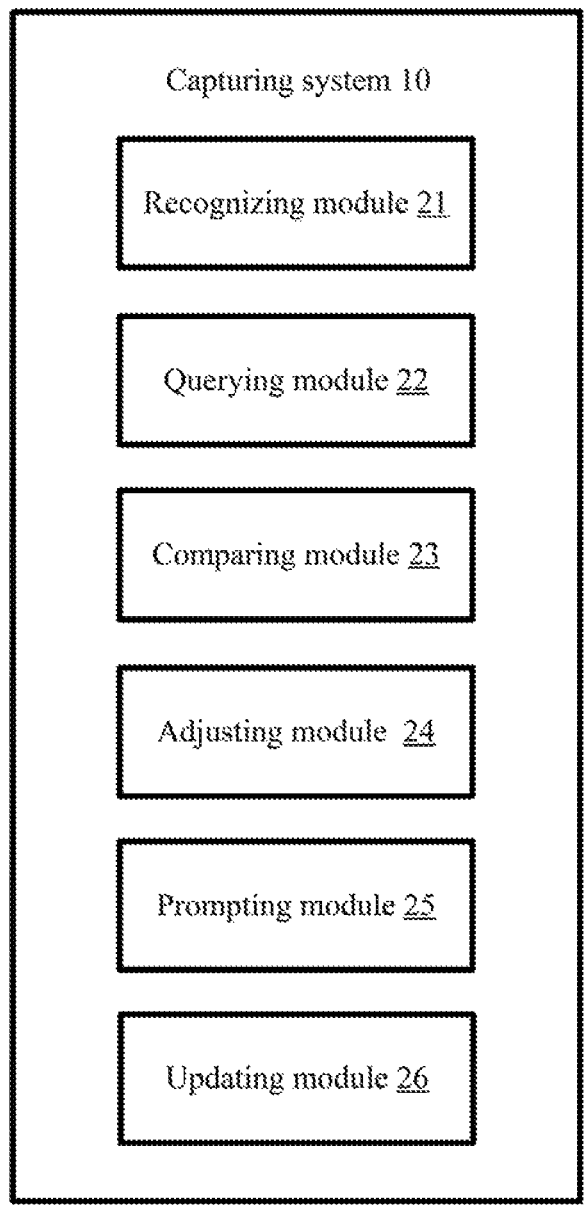
FIG. 2 is a block diagram of one embodiment of modules of the capturing system.

FIG. 2 illustrates a block diagram of one embodiment of modules of the capturing system 10. In at least one embodiment, the capturing system 10 can include a recognizing module 21, a querying module 22, and a comparing module 23, an adjusting module 24, a prompting module 25, and an updating module 26. The modules 21-26 comprise computerized codes in the form of one or more programs that may be stored in the storage device 11. The computerized codes include instructions that are executed by the at least one processor 12.

Figure 3:
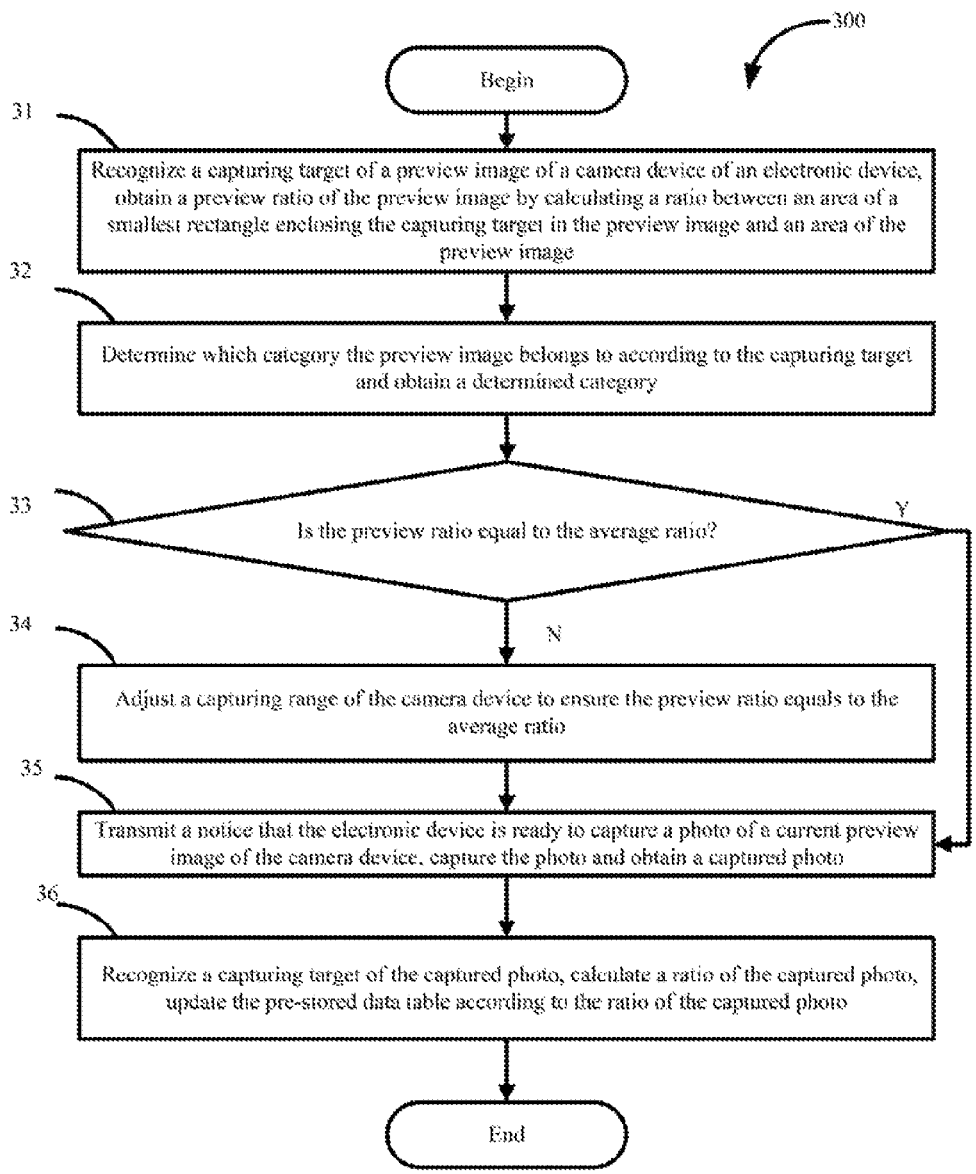
FIG. 3 illustrates a flowchart of one embodiment of a method of capturing a photo.

FIG. 3 illustrates a flowchart which is presented in accordance with an example embodiment. The example method 300 is provided by way of example, as there are a variety of ways to carry out the method. The method 300 described below can be carried out using the configurations illustrated in FIG. 1, for example, and various elements of these figures are referenced in explaining example method 300. Each block shown in FIG. 3 represents one or more processes, methods, or subroutines, carried out in the example method 300. Additionally, the illustrated order of blocks is by example only and the order of the blocks can be changed according to the present disclosure. The example method 300 can begin at block 31. Depending on the embodiment, additional steps can be added, others removed, and the ordering of the steps can be changed.

At block 31, when the camera device 14 is activated, the recognizing module 21 can invoke the image processing software that is stored in the storage device 11 to recognize a capturing target of a preview image of the camera device 14. The recognizing module 21 can further calculate the preview ratio of the preview image. As mentioned above, the preview ratio can be defined to be a ratio between an area of a smallest rectangle enclosing the capturing target in the preview image and an area of the preview image. The area of the smallest rectangle enclosing the capturing target in the preview image can be obtained by multiplying pixels of a length of the smallest rectangle by pixels of a width of the smallest rectangle. The area of the preview image can be obtained by multiplying pixels of a length of the preview image by pixels of a width of the preview image.

In at least one embodiment, the image processing software can pre-store a number of feature templates in the storage device 11. In at least one embodiment, the number of feature templates can include, but are not limited to, one or more human templates, and one or more face templates. The recognizing module 21 can determine the capturing target of the preview image by comparing the preview image with the number of feature templates.

Figure 5:
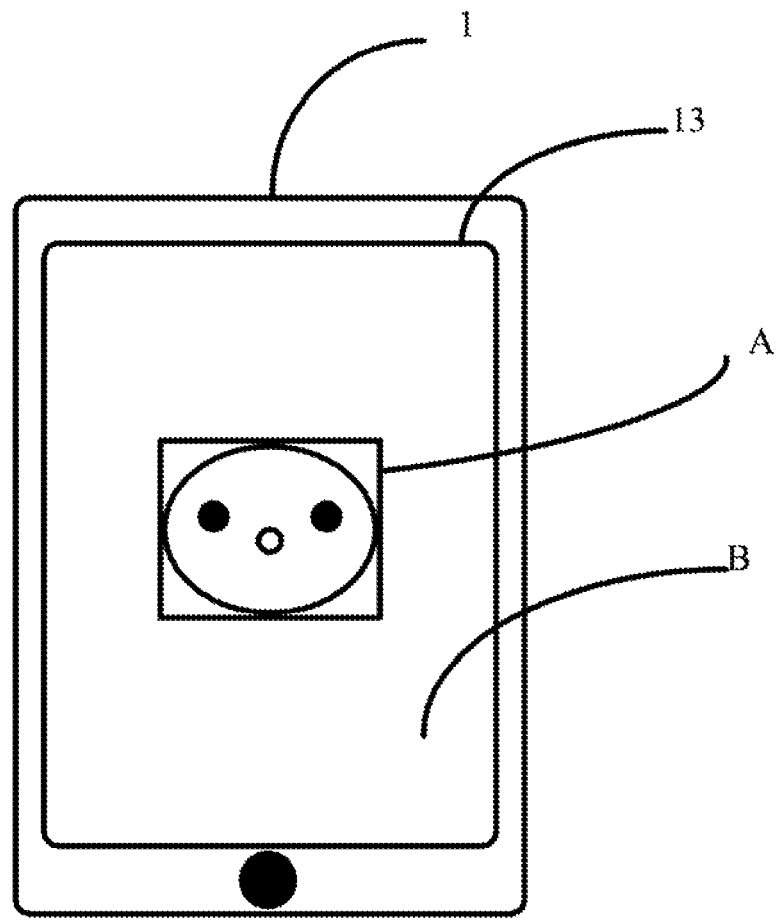
FIG. 5 illustrates an example of a location area of a capturing target of a preview image.

For example, as shown in FIG. 5, the image processing software can determine the capturing target of the preview image is the human face when a face feature such as eyes and/or a mouth are recognized from the preview image. When the capturing target of the preview image is determined, the recognizing module 21 can determine a smallest rectangle enclosing the capturing target (e.g., "A" as shown in FIG. 5) in the preview image (e.g., "B" as shown in FIG. 5) using a face detection algorithm. The recognizing module 21 can calculate the area of the smallest rectangle enclosing the capturing target in the preview image by multiplying pixels of the length of the smallest rectangle by pixels of the width of the smallest rectangle. The recognizing module 21 can calculate the area of the preview image by multiplying pixels of the length of the preview image by pixels of the width of the preview image. The recognizing module 21 can further calculate the ratio between the area of the smallest rectangle enclosing the capturing target in the preview image and the area of the preview image.

At block 32, the querying module 22 can determine which category the preview image belongs to, by searching the data table stored in the storage device 11 according to the capturing target of the preview image. The querying module 22 can further obtain the average ratio of the determined category, and obtain an obtained average ratio.

At block 33, the comparing module 23 can compare the preview ratio with the obtained average ratio. When the preview ratio is not equal to the obtained average ratio, the process goes to block 34. When the preview ratio equals the obtained average ratio, the process goes to block 35.

At block 34, the adjusting module 24 can adjust a capturing range of the camera device 14 via adjusting zoom times of the camera device 14, to ensure the preview ratio equals to the obtained average ratio.

Figure 6:
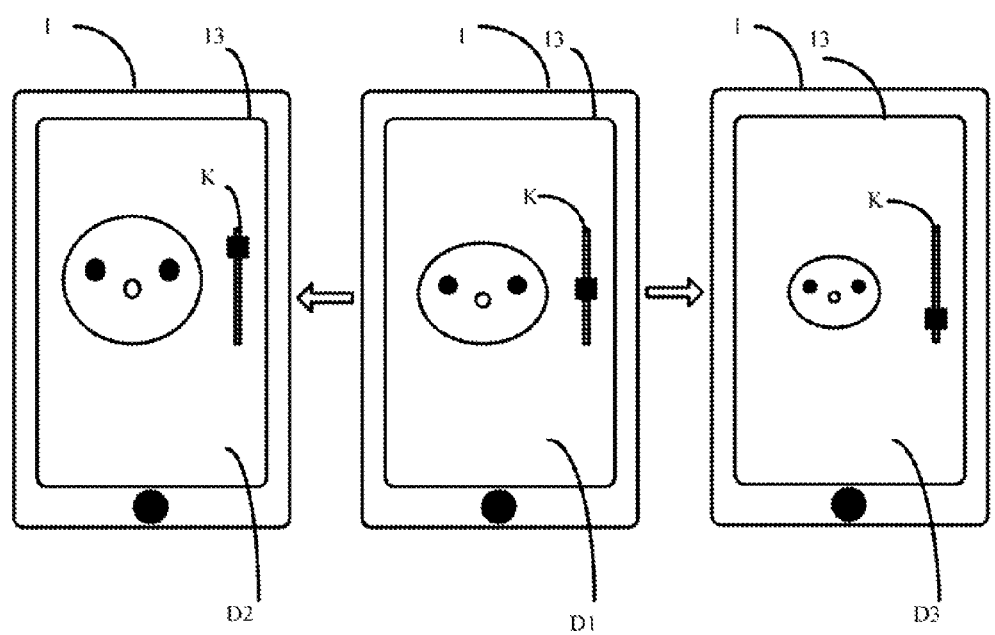
FIG. 6 illustrates an example of adjusting a capturing range of a camera device of the electronic device.

In at least one embodiment, as shown in FIG. 6, when the preview ratio of the preview image "D1" is lesser than the obtained average ratio, the adjusting module 24 can increase the preview ratio of the preview image "D1" by controlling the camera device 14 to decrease the capture range of the camera device 14. For example, as shown in FIG. 6, when the camera device 14 decreases the capture range, a preview image "D2" is obtained.

In other embodiments, when the preview ratio of the preview image "D1" is greater than the obtained average ratio, the adjusting module 24 can decrease the preview ratio of the preview image "D1", by controlling the camera device 14 to increase the capture range. For example, as shown in FIG. 6, when the camera device 14 increases the capture range, a preview image "D3" is obtained.

It should be noted that the capture range of the camera device 14 cannot be infinitely increased or decreased. In at least one embodiment, when the image processing software cannot recognize the capturing target of the preview image, the adjusting module 24 can stop adjusting the capture range of the camera device 14.

At block 35, the prompting module 25 can transmit a notice that the electronic device 1 is ready to capture a photo of a current preview image of the camera device 14. In at least one embodiment, the notice can be a voice notice, or a text notice. In at least one embodiment, a user can further adjust the capture range of the camera device 14 manually. In at least one embodiment, the prompting module 25 can further generate an adjusting icon (e.g., "K" as shown in FIG. 6) for adjusting the capturing range of the camera device 14 when the notice is transmitted. The prompting module 25 can display the adjusting icon on the display device 13. The user can manually adjust the capture range of the camera device 14 using the adjusting icon.

In at least one embodiment, when the preview ratio equals to the obtained average ratio, the prompting module 25 can automatically control the camera device 14 to capture the photo. In other embodiments, the prompting module 25 can control the camera device 14 to capture the photo in response to a predetermined signal is received. In at least one embodiment, the predetermined signal can be a signal that a home button and a power button of the electronic device 1 are pressed at a same time.

At block 36, when the prompting module 25 captures the photo and obtains a captured photo. The recognizing module 21 can calculate the ratio of the captured photo. The updating module 26 can update the data table stored in the storage device 11 according to the ratio of the captured photo. It should be noted that in the block 31, the recognizing module 21 has recognized the capturing target of the preview image, then in block 36, the recognizing module 21 can determine the capturing target of the captured photo is same as the capturing target of the preview image determined in block 31. Accordingly, the recognizing module 21 can determine the category that the captured photo belongs to is the same as the category that preview image belongs to.

In at least one embodiment, if the user does not manually adjust the capture range of the camera device 14, thus the ratio of the captured photo is the same as the obtained average ratio. Then the recognizing module 21 is no need to calculate the ratio of the captured photo. The updating module 26 can update the data table by directly adding "1" to the number of the photos of the category that the captured photo belongs to.

In other embodiments, if the user manually adjusts the capture range of the camera device 14, and the ratio of the captured photo is not equal to the obtained average ratio, then the updating module 26 can calculate a current average ratio of the category that the captured photo belongs to, using a predetermined formula. The updating module 26 can update the data table by replacing the obtained average ratio with the current average ratio. In at least one embodiment, the predetermined formula can be:

$$R=(R1*C+R2)/(C+1)$$

wherein, "R" represents the current average ratio of the category that the captured photo belongs to, "R1" represents the obtained average ratio, "R2" represents the ratio of the captured photo, and "C" represents the previous number of the photos included in the category that the captured photo belongs to.

As can be seen from the block 31 to block 36, the present disclose can recognize the capturing targets of the captured photos, and classify the captured photos into different categories according to recognized capturing targets. The present disclose can calculate an average ratio of each of the categories. When the camera device 14 captures the photo of the current preview image of the camera device 14, the present disclose can further adjust the capturing range of the camera device 14, according to the average ratio of one of the categories that the current preview image belongs to.

In other embodiments, the recognizing module 21, querying module 22, comparing module 23, adjusting module 24, prompting module 25, and the updating module 26 of the capturing system 10 can be hardware or firmware.

It should be noted that, when the electronic device 1 includes a plurality of camera devices, for example, the electronic device 1 includes a front camera device and a rear camera device. Because different photos captured by different camera devices have difference between each other, for example, the front camera device generally captures photos of nearby scenes, then a ratio of a photo captured by the front camera device is greater. In contrast, the rear camera device generally captures photos of distant scenes, then the ratio of the photo captured by the rear camera device is smaller. Thus, we can see that the average ratio that is suitable for capturing a photo of a certain scene using the front camera device, is not suitable for capturing a photo of the certain scene using the rear camera device. In at least one embodiment, for solving this issue, the recognizing module 21 can further label the photos according to the camera devices used to capture the photos. When the recognizing module 21 recognizes the capturing targets of the captured photos using the image processing software, the recognizing module 21 can generate a plurality of data tables to record data of the captured photos that are captured by the plurality of camera devices. In at least one embodiment, a number of the plurality of data tables equal to a number of the plurality of camera devices, each data table corresponds to each camera device. For example, the recognizing module 21 can generate a first data table to record data of photos captured by a first camera device, and generate a second data table to record data of photos captured by a second camera device.

Thus when the first camera device or the second camera device captures photos next time, corresponding data table can be used to adjust the capturing range.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A photo capturing method applied in an electronic device, the method comprising:
    recognizing a capturing target of a preview image of a camera device of the electronic device;
    obtaining a preview ratio of the preview image by calculating a ratio between an area of a smallest rectangle enclosing the capturing target in the preview image and an area of the preview image;
    determining which category the preview image belongs to according to the capturing target and obtaining a determined category;
    obtaining an average ratio of the determined category;
    comparing the preview ratio and the average ratio;
    adjusting a capturing range of the camera device when the preview ratio is not equal to the average ratio; and
    recognizing the capturing target of each of photos stored in the electronic device;
    classifying each of the photos into a plurality of categories according to the capturing target of each of the photos;
    calculating a first ratio of each photo of each of the plurality of categories; and
    determining the average ratio of each of the plurality of categories using all the first ratios of the each of the plurality of categories.

2. The method according to claim 1, further comprising:
    controlling the camera device to enlarge the capturing range when the preview ratio is greater than the average ratio; and
    controlling the camera device to reduce the capturing range when the preview ratio is less than the average ratio.

3. The method according to claim 1, further comprising:
    transmitting a notice that the electronic device is ready to capture a photo of the preview image when the preview ratio equals the average ratio.

4. The method according to claim 3, further comprising:
    generating and displaying an adjusting icon of adjusting the capturing range of the camera device; and
    controlling the camera device to capture the photo of the preview image and obtaining a captured photo.

5. The method according to claim 4, further comprising:
    recognizing the capturing target of the captured photo;
    determining which category the captured photo belongs to according to the capturing target of the captured photo;
    calculating a second ratio of the captured photo;
    updating a pre-stored data table that records the plurality of categories according to the second ratio.

6. The method according to claim 5, further comprising:
    updating the pre-stored data table by directly adding 1 to a number of photos of the category that the captured photo belongs to when the capturing range of the camera device is not adjusted by a user.

7. The method according to claim 6, further comprising:
    determining whether the second ratio is equal to the average ratio of the category that the captured photo belongs to when the capturing range of the camera device is adjusted by the user;
    calculating a current average ratio of the category that the captured photo belongs to, using a predetermined formula; and
    replacing a previous average ratio of the category that the captured photo belongs to with the current average ratio.

8. The method according to claim 7, wherein the predetermined formula is:

$$R=(R1*C+R2)/(C+1),$$

wherein, "R" represents the current average ratio of the category that the captured photo belongs to, "R1" represents the previous average ratio of the category that the captured photo belongs to, "R2" represents the second ratio, and "C" represents previous number of photos included in the category that the captured photo belongs to.

9. An electronic device comprising:
    a camera device;
    a storage device that stores a data table recording a plurality of photo categories;
    at least one processor; and
    the storage device further stores one or more programs that, when executed by the at least one processor, cause the at least one processor to:
    recognize a capturing target of a preview image of a camera device of the electronic device;
    obtain a preview ratio of the preview image by calculating a ratio between an area of a smallest rectangle enclosing the capturing target in the preview image and an area of the preview image;
    determine which category the preview image belongs to according to the capturing target and obtain a determined category;
    obtain an average ratio of the determined category;
    compare the preview ratio and the average ratio;
    adjust a capturing range of the camera device when the preview ratio is not equal to the average ratio; and
    recognize the capturing target of each of photos stored in the electronic device;
    classify each of the photos into a plurality of categories according to the capturing target of each of the photos;
    calculate a first ratio of each photo of each of the plurality of categories; and
    determining the average ratio of each of the plurality of categories using all the first ratios of the each of the plurality of categories.

10. The electronic device according to claim 9, wherein the at least one processor is further caused to:
    control the camera device to enlarge the capturing range when the preview ratio is greater than the average ratio; and
    control the camera device to reduce the capturing range when the preview ratio is less than the average ratio.

11. The electronic device according to claim 9, wherein the at least one processor is further caused to:
    transmit a notice that the electronic device is ready to capture a photo of the preview image when the preview ratio equals the average ratio.

12. The electronic device according to claim 11, wherein the at least one processor is further caused to:
    generate and display an adjusting icon of adjusting the capturing range of the camera device; and control the camera device to capture the photo of the preview image and obtain a captured photo.

13. The electronic device according to claim 12, wherein the at least one processor is further caused to:
   recognize the capturing target of the captured photo;
   determine which category the captured photo belongs to according to the capturing target of the captured photo;
   calculate a second ratio of the captured photo; and
   update a pre-stored data table that records the plurality of categories according to the second ratio.

14. The electronic device according to claim 13, wherein the at least one processor is further caused to:
   update the pre-stored data table by directly adding 1 to a number of photos of the category that the captured photo belongs to when the capturing range of the camera device is not adjusted by a user.

15. The electronic device according to claim 14, wherein the at least one processor is further caused to:
   determine whether the second ratio is equal to the average ratio of the category that the captured photo belongs to when the capturing range of the camera device is adjusted by the user;
   calculate a current average ratio of the category that the captured photo belongs to, using a predetermined formula; and
   replace a previous average ratio of the category that the captured photo belongs to with the current average ratio.

16. The electronic device according to claim 15, wherein the predetermined formula is:

$$R=(R1*C+R2)/(C+1),$$

wherein, "R" represents the current average ratio of the category that the captured photo belongs to, "R1" represents the previous average ratio of the category that the captured photo belongs to, "R2" represents the second ratio, and "C" represents previous number of photos included in the category that the captured photo belongs to.

17. A non-transitory storage medium having stored thereon instructions that, when executed by a processor of an electronic device, causes the processor to perform a method for capturing a photo, wherein the method comprises:
   recognizing a capturing target of a preview image of a camera device of the electronic device;
   obtaining a preview ratio of the preview image by calculating a ratio between an area of a smallest rectangle enclosing the capturing target in the preview image and an area of the preview image;
   determining which category the preview image belongs to according to the capturing target and obtaining a determined category;
   obtaining an average ratio of the determined category;
   comparing the preview ratio and the average ratio;
   adjusting a capturing range of the camera device when the preview ratio is not equal to the average ratio; and
   recognizing the capturing target of each of photos stored in the electronic device;
   classifying each of the photos into a plurality of categories according to the capturing target of each of the photos;
   calculating a first ratio of each photo of each of the plurality of categories; and
   determining the average ratio of each of the plurality of categories using all the first ratios of the each of the plurality of categories.

18. The non-transitory storage medium according to claim 17, wherein the method further comprises:
   controlling the camera device to enlarge the capturing range when the preview ratio is greater than the average ratio; and
   controlling the camera device to reduce the capturing range when the preview ratio is less than the average ratio.

19. The non-transitory storage medium according to claim 17, wherein the method further comprises:
   transmitting a notice that the electronic device is ready to capture a photo of the preview image when the preview ratio equals the average ratio.

20. The non-transitory storage medium according to claim 19, wherein the method further comprises:
   generating and displaying an adjusting icon of adjusting the capturing range of the camera device; and
   controlling the camera device to capture the photo of the preview image and obtaining a captured photo.

21. The non-transitory storage medium according to claim 20, wherein the method further comprises:
   recognizing the capturing target of the captured photo;
   determining which category the captured photo belongs to according to the capturing target of the captured photo;
   calculating a second ratio of the captured photo;
   updating a pre-stored data table that records the plurality of categories according to the second ratio.

22. The non-transitory storage medium according to claim 21, wherein the method further comprises:
   updating the pre-stored data table by directly adding 1 to a number of photos of the category that the captured photo belongs to when the capturing range of the camera device is not adjusted by a user.

23. The non-transitory storage medium according to claim 22, wherein the method further comprises:
   determining whether the second ratio is equal to the average ratio of the category that the captured photo belongs to when the capturing range of the camera device is adjusted by the user;
   calculating a current average ratio of the category that the captured photo belongs to, using a predetermined formula; and
   replacing a previous average ratio of the category that the captured photo belongs to with the current average ratio.

24. The non-transitory storage medium according to claim 23, wherein the predetermined formula is:

$$R=(R1*C+R2)/(C+1),$$

wherein, "R" represents the current average ratio of the category that the captured photo belongs to, "R1" represents the previous average ratio of the category that the captured photo belongs to, "R2" represents the second ratio, and "C" represents previous number of photos included in the category that the captured photo belongs to.

* * * * *